US012620505B2

(12) United States Patent
Lust

(10) Patent No.: US 12,620,505 B2
(45) Date of Patent: May 5, 2026

(54) MULTIPLE SOURCE CONTAINER

(71) Applicant: Northstar Medical Technologies, LLC, Beloit, WI (US)

(72) Inventor: Dorian Lust, Columbus, WI (US)

(73) Assignee: NorthStar Medical Technologies LLC, Beloit, WI (US)

( * ) Notice: Subject to any disclaimer, the term of this patent is extended or adjusted under 35 U.S.C. 154(b) by 389 days.

(21) Appl. No.: 18/229,804

(22) Filed: Aug. 3, 2023

(65) Prior Publication Data

US 2024/0194363 A1 Jun. 13, 2024

Related U.S. Application Data

(60) Provisional application No. 63/431,413, filed on Dec. 9, 2022.

(51) Int. Cl.
*G21F 5/015* (2006.01)
*G21F 5/12* (2006.01)

(52) U.S. Cl.
CPC ................ *G21F 5/015* (2013.01); *G21F 5/12* (2013.01)

(58) Field of Classification Search
None
See application file for complete search history.

(56) References Cited

U.S. PATENT DOCUMENTS 4,340,153 A * 7/1982 Spivey .................... A61J 3/002 222/144.5
5,110,474 A 5/1992 Horwitz et al.
5,603,834 A 2/1997 Rogers et al.
5,707,525 A 1/1998 Rogers et al.
5,854,968 A 12/1998 Horwitz et al.
5,863,439 A 1/1999 Dietz et al.
5,888,397 A 3/1999 Rogers et al.
6,511,603 B1 1/2003 Dietz et al.
6,852,296 B2 2/2005 Bond et al.
7,157,022 B2 1/2007 Horwitz et al.
(Continued)

FOREIGN PATENT DOCUMENTS

CA 2333937 A1 12/1999
ES 2370858 B1 * 11/2012 ............. G21F 5/015
ES 2677024 T3 * 7/2018 ........... A61B 6/4423

OTHER PUBLICATIONS

McAlister, D.R et al., "Automated Two Column Generator Systems for Medical Radionuclides," Applied Radiation and Isotopes, vol. 67, issue 11, pp. 1985-1991, Nov. 2009. https://doi.org/10.1016/j.apradiso.2009.07.019.

(Continued)

*Primary Examiner* — Andrew Smyth
(74) *Attorney, Agent, or Firm* — Husch Blackwell LLP

(57) ABSTRACT

A multiple source container for radioactive material is provided. The multiple source container can include a cap attachable to a housing. The housing can include a plurality of source vials and a plurality of transfer vials. The cap and the housing can each be made from a radiation shielding material such that the source vials and the transfer vials can store radioactive material therein. The multiple source container can further include a plurality of ports, wherein a hole can be provided at a bottom of each of the plurality of source vials and each of the plurality of transfer vials, wherein the hole can each be coupled to one of the plurality of ports respective.

15 Claims, 4 Drawing Sheets

(56) References Cited

U.S. PATENT DOCUMENTS

| | | | | |
|---|---|---|---|---|
| 7,553,461 | B2 | 6/2009 | Horwitz et al. | |
| 9,299,466 | B2 | 3/2016 | Isensee et al. | |
| 9,336,912 | B2 | 5/2016 | Isensee | |
| 2006/0076520 | A1* | 4/2006 | Drobnik | A61L 2/081 250/506.1 |
| 2008/0210892 | A1 | 9/2008 | Wagner | |
| 2015/0165341 | A1 | 6/2015 | Isensee | |
| 2017/0042767 | A1 | 2/2017 | Osborn et al. | |

OTHER PUBLICATIONS

Gula, M. et al., "Separation, Concentration, and Immobilization of Technetium and Iodine from Alkaline Supernate Waste," Final Report by Eichrom Industries, Inc. for U.S. Department of Energy, Office of Fossil Energy, Federal Energy Technology, Center, Morgantown, West Virginia, Dec. 7, 1998 (100 pages).

Bond, A.H. et al., "Design, Synthesis, and Uptake Performance of ABEC Resins for the Removal of Pertechnetate from Alkaline Radioactive Wastes," Ind. Eng. Chem. Res. 1999, 38, 4, pp. 1676-1682. https://doi.org/10.1021/ie980072n.

Bond, A.H. et al., "Flowsheet Feasibility Studies Using ABEC Resins for Removal of Pertechnetate from Nuclear Wastes," Ind. Eng. Chem. Res. 1999, 38, 4, pp. 1683-1689. https://doi.org/10.1021/ie9806110.

Argyrou, M. et al., "Rhenium-188 Production in Hospitals, by w-188/re-188 Generator, for Easy Use in Radionuclide Therapy," Int J Mol Imaging. 2013; 2013:290750. doi: 10.1155/2013/290750.

Horwitz, E.P. et al., "A Lead-Selective Extraction Chromatographic Resin and its Application to the Isolation of Lead from Geological Samples," Analytica Chimica Acta, vol. 292, issue 3, Jul. 11, 1994, pp. 263-273. https://doi.org/10.1016/0003-2670(94)00068-9.

International Search Report re application No. PCT/US2023/029380, dated Nov. 8, 2023.

Written Opinion re application No. PCT/US2023/029380, dated Nov. 8, 2023.

* cited by examiner

MULTIPLE SOURCE CONTAINER

CROSS-REFERENCE TO RELATED APPLICATION

This application claims the benefit of the filing date of U.S. provisional application Ser. No. 63/431,413, filed Dec. 9, 2022, entitled, “Multiple Source Container”, which is hereby incorporated by reference as if fully set forth herein.

TECHNICAL FIELD

This disclosure generally relates to an apparatus for containing source materials in a manufacturing process. More specifically, this disclosure relates to an apparatus that contains multiple radioactive source materials in as small of a footprint as possible.

BACKGROUND

Manufacturing and productions of radioisotopes such as those used in medical contexts often utilize one or more radioactive source materials. Handling of radioactive source materials typically involves shielding the radioactive source materials from the external environment.

Some materials suitable for shielding for radioactive materials can be lead, tungsten, or concrete. Having a shielded container for each radioactive source material can become unwieldy and takes up a substantial amount of space in a manufacturing facility. Thus, there is a need for a device and system capable of holding multiple radioactive source materials of a same or a different type, while minimizing the footprint for such a device.

Moreover, vials contain radioactive source materials and can be delivered at different times and the vials can contain different amounts of radioactivity. Thus, there is a need to maintain multiple vials so that each can be tracked separately, rather than mixing them all into a single larger reservoir.

BRIEF SUMMARY

A first aspect of this disclosure pertains to a multiple source container having a cap attachable to a housing. The housing can include a plurality of source vials and a plurality of transfer vials.

A second aspect of this disclosure pertains to the multiple source container of the first aspect, wherein the cap and the housing are made from a radiation shielding material.

A third aspect of this disclosure pertains to the multiple source container of the first aspect, wherein the plurality of source vials and the plurality of transfer vials are adapted to store radioactive materials therein.

A fourth aspect of this disclosure pertains to the multiple source container of the first aspect further includes a plurality of ports, wherein a hole is provided at a bottom of each of the plurality of source vials and each of the plurality of transfer vials, wherein the hole is each coupled to one of the plurality of ports respective.

A fifth aspect of this disclosure pertains to the multiple source container of the first aspect, wherein the cap further includes an external vent configured to vent from the housing to an external environment when the cap is affixed to the housing.

A sixth aspect of this disclosure pertains to the multiple source container of the first aspect, wherein the housing includes a plurality of dividing walls, wherein each of the plurality of dividing walls separates two of the plurality of source vials from one another, two of the plurality of transfer vials from one another, or one of the plurality of source vials from one of the plurality of transfer vials.

A seventh aspect of this disclosure pertains to the multiple source container of the first aspect, wherein each of the dividing walls further includes a balancing vent.

An eighth aspect of this disclosure pertains to the multiple source container of the first aspect, wherein the housing includes a fluid trap.

A ninth aspect of this disclosure pertains to the multiple source container of the first aspect, wherein the cap further includes a vent channel at a bottom surface of the cap, the vent channel is positioned to provide venting to at least one of the plurality of source vials or the plurality of transfer vials.

A tenth aspect of this disclosure pertains to the multiple source container of the fourth aspect, wherein the housing further includes a base having a manifold, and wherein the plurality of ports are provided in the manifold.

An eleventh aspect of this disclosure pertains to the multiple source container of the tenth aspect, wherein the manifold further includes a mount for receiving one or more probes.

A twelfth aspect of this disclosure pertains to the multiple source container of the fourth aspect, wherein each of the plurality of ports is a one-way valve or a two-way valve.

A thirteenth aspect of this disclosure pertains to the multiple source container of the first aspect, wherein the cap and the housing are each constructed out of a radiation shielding material.

A fourteenth aspect of this disclosure pertains to the multiple source container of the first aspect, wherein the plurality of source vials are each provided along a perimeter of the housing, and wherein the plurality of transfer vials are each provided proximal to a center of the housing.

A fifteenth aspect of this disclosure pertains to the multiple source container of the first aspect, where a bottom of each of the plurality of source vials and each of the plurality of transfer vials are conical in shape.

A sixteenth aspect of this disclosure pertains to a method for handling multiple source materials including providing a multiple source container including a cap attachable to a housing; and the housing comprising a plurality of source vials and a plurality of transfer vials; and providing a first fluid in a first source vial that is one of the plurality of source vials.

A seventeenth aspect of this disclosure pertains to the method of the sixteenth aspect further including transferring the fluid from the first source vial to one of a plurality of transfer vials.

An eighteenth aspect of this disclosure pertains to the method of the seventeenth aspect further including transferring the fluid from the one of the plurality of transfer vials back to the first source vial.

A nineteenth aspect of this disclosure pertains to the method of the sixteenth aspect further including providing a second fluid in a second source vial that is another one of the plurality of source vials, wherein the first fluid is different from the second fluid.

A twentieth aspect of this disclosure pertains to the method of the sixteenth aspect, wherein the fluid is a radioactive material.

Figure 1:
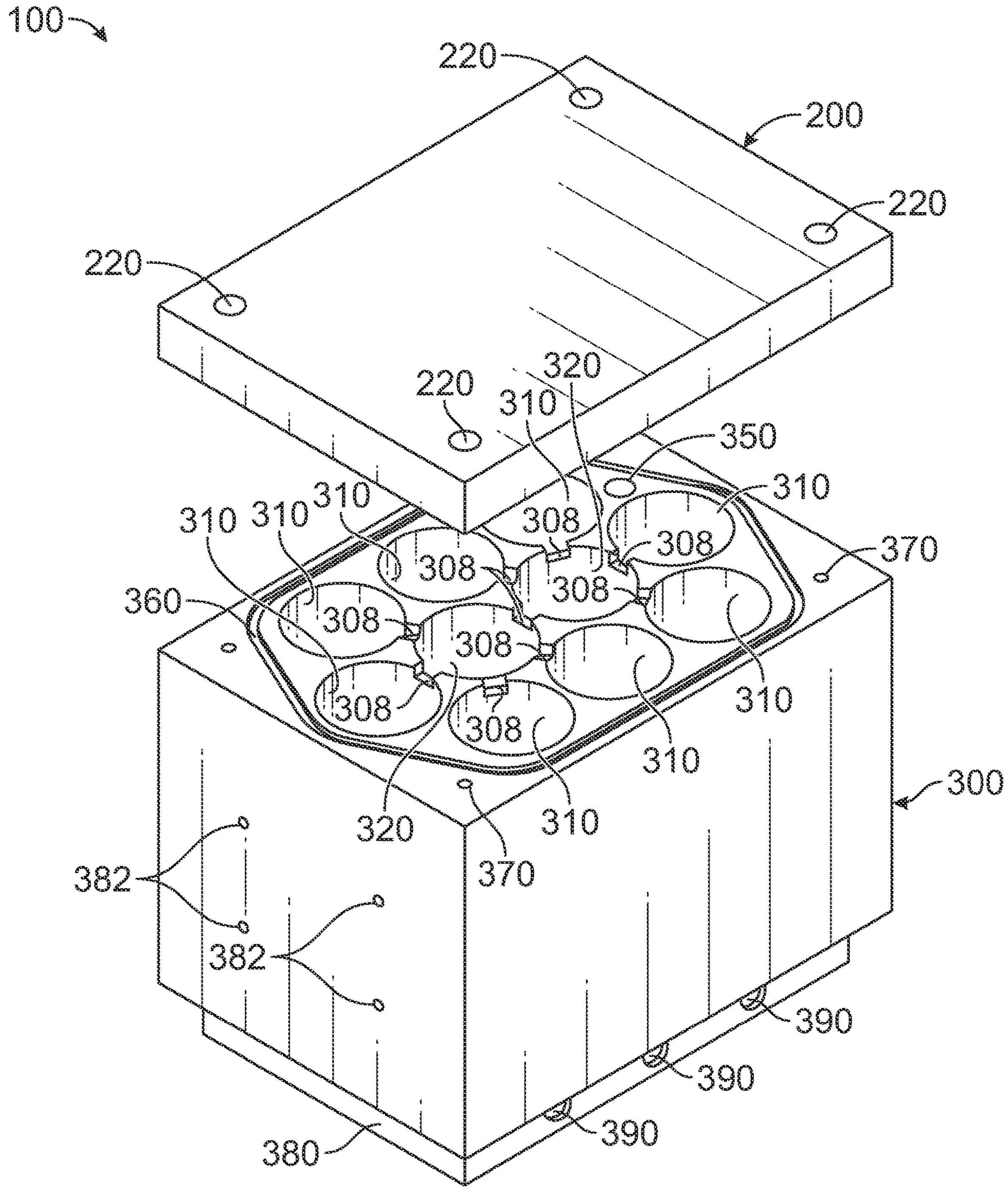
FIG. 1 illustrates an isometric view of a multiple source container according to an embodiment.

Before explaining the disclosed embodiment of this disclosure in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

As shown in FIGS. 1-5, the embodiments of this disclosure include a multiple source container 100, which may be referred to as a "source farm".

Referring to FIG. 1, the multiple source container 100 can include a cap 200 and a housing 300. The cap 200 can have a first outer profile that is the same or substantially similar to a second outer profile of the housing 300, such that the cap 200 can cover the housing 300 when the cap 200 is placed over the housing 300. For example, both the first outer profile of the cap 200 and the second outer profile of the housing 300 can be substantially rectangular in shape. However, other shapes can also be used and are contemplated herein.

Figure 2:
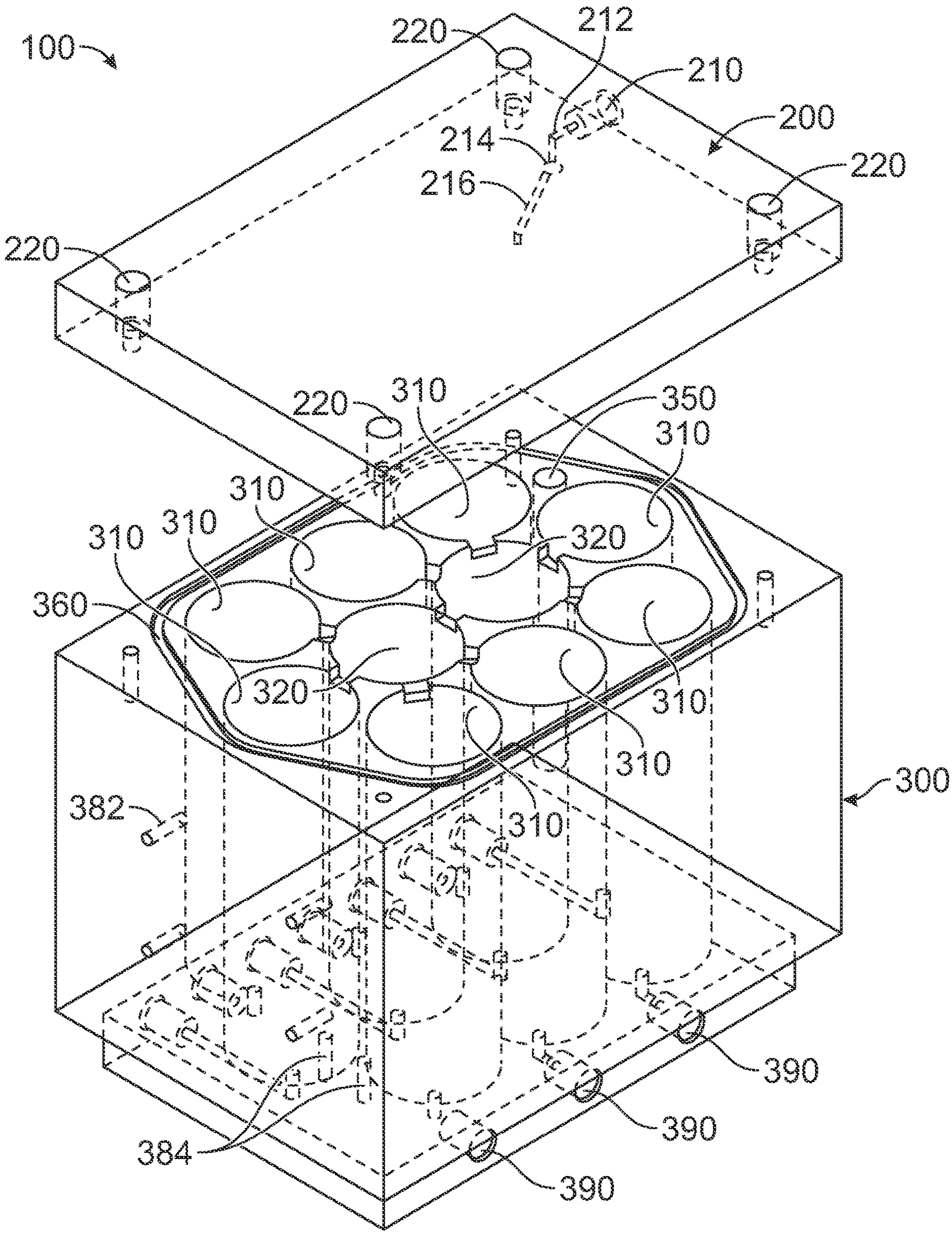
FIG. 2 illustrates a transparent view of the multiple source container of FIG. 1.
Figure 3:
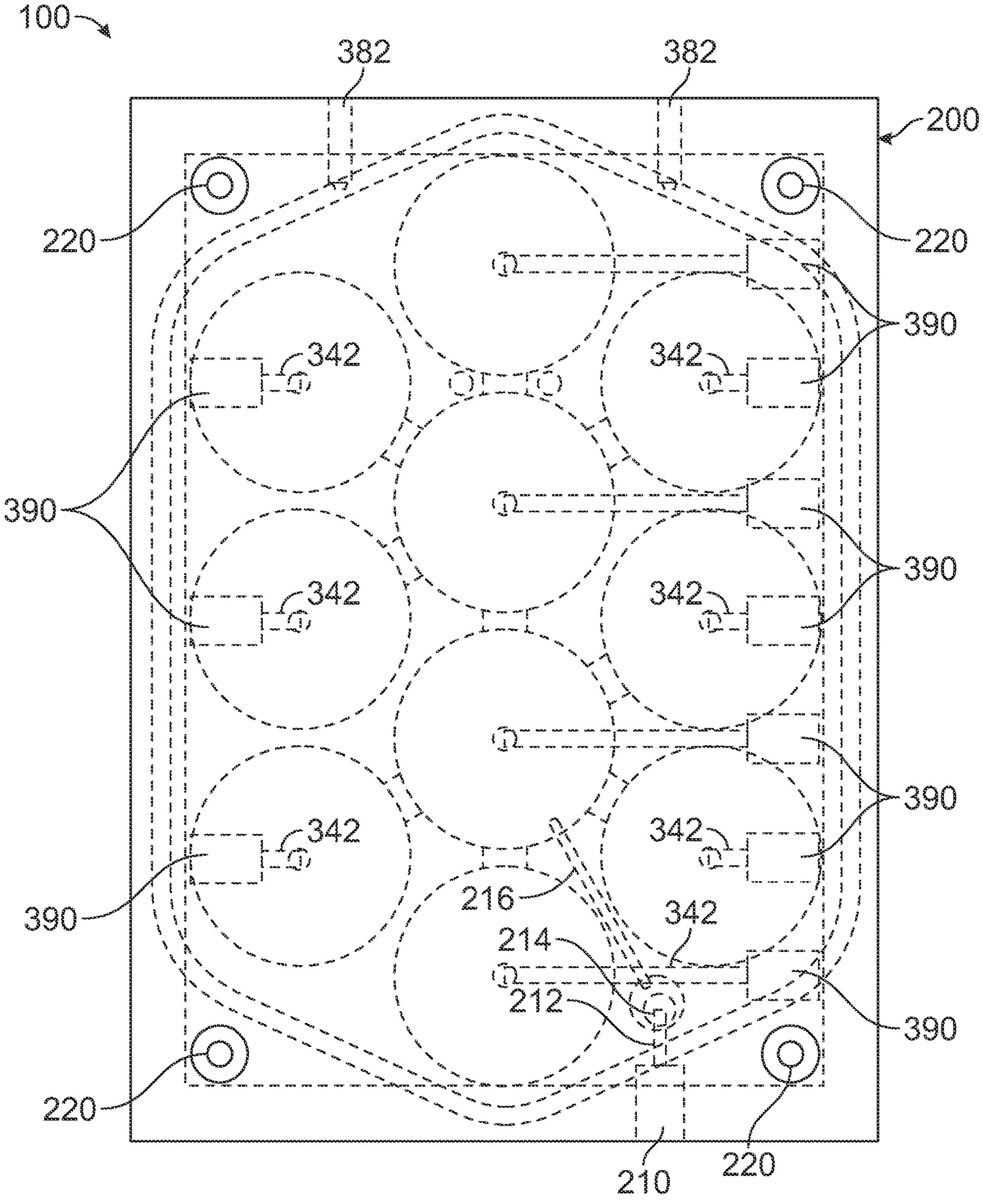
FIG. 3 illustrates a top transparent view of the multiple source container of FIG. 1.
Figure 4:
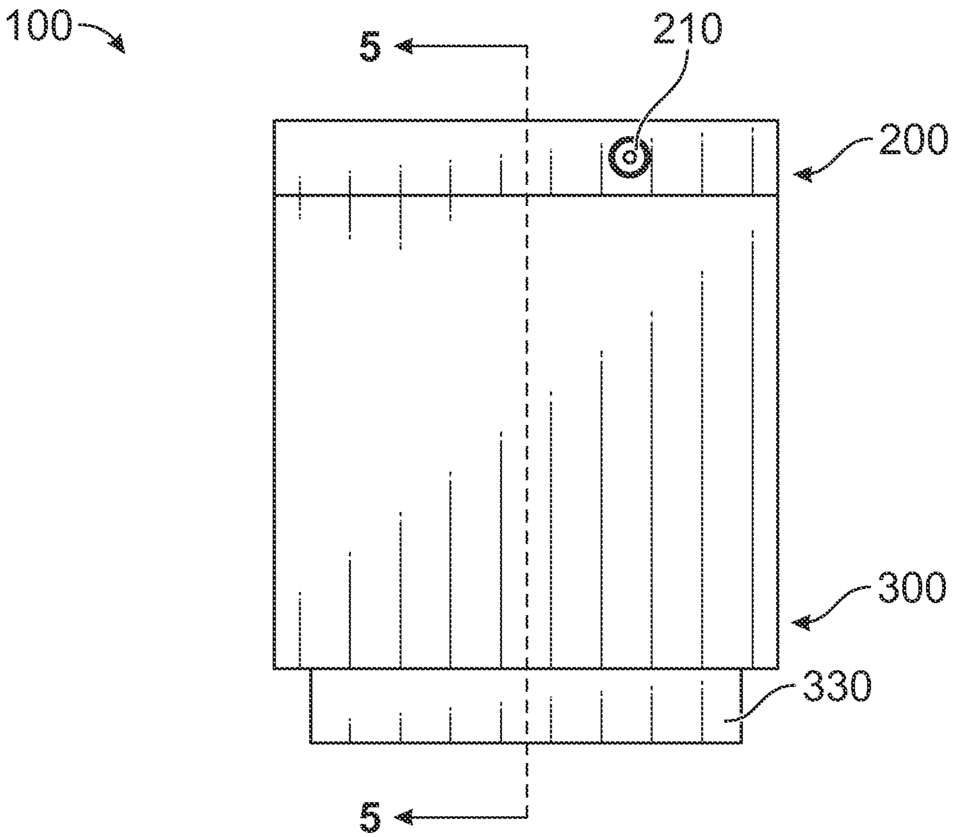
FIG. 4 illustrates a side plane view of the multiple source container of FIG. 1.

The cap 200 can include an external vent 210 (see FIG. 4). The external vent 210 can be to the atmosphere and can maintain the multiple source container 100 at atmospheric pressure when adding or removing fluid from the multiple source container 100. As best shown in FIGS. 2 and 3, the external vent 210 can be coupled to a vent bore 212. The vent bore 212 can be coupled to a vent opening 214 such that the vent opening 214 can be in fluid communication with an external environment such as the atmosphere through the vent bore 212.

The cap 200 can also include one or more first fastening bores 220 to receive one or more fasteners (not shown). The fasteners can secure the cap 200 onto the housing 300 such that the cap 200 is attachable to and detachable from the housing 300.

The housing 300 can include one or more source vials 310 and one or more transfer vials 320. In the illustrated embodiments shown in FIGS. 1-3, eight source vials 310 can be provided along a perimeter of the housing 300, and two transfer vials 320 can be provided in a center of the housing 300. However, fewer or more source vials 310 and/or transfer vials 320 can be provided and are contemplated herein.

It is to be understood that the locations and arrangements of the source vials 310 and the transfer vials 320 can vary. For example, in other embodiments, the transfer vials 310 can be provided along the perimeter of the housing 300 and the source vials 310 can be provided in the center of the housing 300. In additional embodiments, the source vials 310 and the transfer vials 320 can be provided alongside of each other. Such and other variations and arrangements are also within the spirit of this disclosure.

Figure 5:
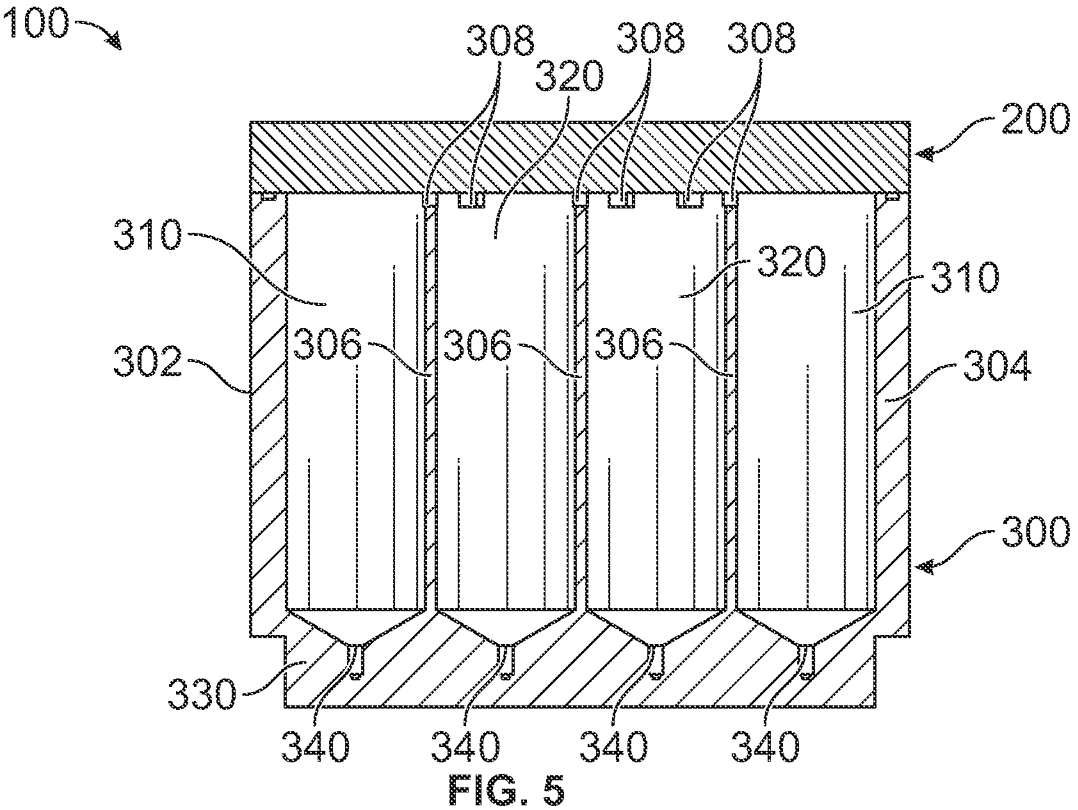
FIG. 5 illustrates a cross-sectional view of the multiple source container down the cutting plane line "A" as indicated in FIG. 4.

As best shown in FIG. 5, the source vials 310 and the transfer vials 320 can each be a cavity within the housing 300. The housing 300 can include a first side wall 302 and a second side wall 304 opposite from the first side wall 302. The housing 300 can also include one or more dividing walls 306, each shared by at least two vials. The housing 300 can further include a base 330 that can serve as a bottom of the housing 300. The side walls 304, together with the dividing walls 306 and the base 330 can define a shape or a profile of the source vials 310 and/or the transfer vials 320.

In some embodiments, the source vials 310 and/or the transfer vials 320 can each include a bottom having a hole 340 for filling and/or draining. The bottom of the vial can have a conical shape or other suitable shapes such that all or substantially all of the fluid can be drained from the bottom of the vial through the hole 340, which can increase efficiency by processing all of the fluid each cycle and while leaving minimal residue behind and can also minimize carryover between subsequent batches of fluid. Fluid lines can be kept small so that the surface tension maintains a column of fluid that can be effectively pulled, and air cleared leaving minimal residue behind.

Returning to FIG. 1, the housing 300 can also include a fluid trap 350. The fluid trap 350 can operate in conjunction with the external vent 210 to prevent the escape of any radioactive fluid in the form of droplets pushed by the gas flow out of the line. In some embodiments, the vent opening 214 can be provided above the fluid trap 350 (see FIG. 3). The fluid trap 350 can contain therein an overflow vial, such that splashes, droplets, or condensation that can contain radioactivity can first fall into the overflow vial rather than be blown out through a continuous tube.

Moreover, the housing 300 can include one or more balancing vents 308. In some embodiments, the balancing vents 308 can be provided on the dividing walls 306 between two or more vials. For example, as shown in the illustrated embodiments in FIGS. 1 and 2, the balancing vents 308 can be provided at a top end portion of the dividing walls 306 and can be in a form of a channel or a gap, allowing gas to vent therethrough from one vial to another.

As fluid is pulled for processing from the source vial 310, the fluid can be stored temporarily in the transfer vial 320 and then returned to the source vial 310 it began in. The balancing vents 308 can ensure that the total volume of liquid and gas in the multiple source container 100 remain constant or substantially constant. The balancing vents 308 can also balance the volume of fluid removed with gas from an adjacent vial where fluid was added, thus reducing the amount of external air from entering into the multiple source container 100 while reducing the chance that radioactivity can inadvertently escape through the external vent 210.

The housing 300 can also include a groove 360 along a perimeter encircling the source vials 310 and the transfer vials 320. The cap 200 can include a seal (not shown) such as an O-ring that can be fitted into the groove 360 when the cap 200 is coupled with the housing 300, thus creating a sealed environment within the multiple source container 100. The sealed environment can allow the liquid that can exist in the source vials 310 and/or the transfer vials 320 to be pressurized from above, which can allow fluids to be pushed out of the multiple source container 100, rather than pulled out under vacuum with a pump or other similar devices.

One or more second fastening bores 370 can be provided on the housing 300. Each of the second fastening bores 370 can correspond with one of the first fastening bores 220, allowing the fastener to secure the cap 200 to the housing 300.

Referring to FIGS. 2, 3 and 5, the base 330 can include a manifold 380 having one or more ports 390. The ports 390 can be coupled with external pumps and/or valves to move fluid to and/or from the source vials 310 and/or the transfer vials 320. In some embodiments, the ports 390 can be in the form of a valve such as a one-way or a two-way valve.

A connecting bore 342 can be provided to provide fluid communication between the holes 340 and the ports 390. The number of the ports 390 provided can depend on the number of vials within the housing 300. For example, in the illustrated embodiment shown in FIGS. 2 and 3, ten total vials can be provided (including eight source vials 310 and two transfer vials 320), in this case, ten ports 390 can be provided, each corresponding to a respective vial.

The housing 300 can further include one or more mounting points 382 to attach the housing 300 to a bracket (not shown) that can hold housing 300 in a shielding cavity. Moreover, the manifold 380 can also include a mount 384 for one or more conductivity probes to detect if there has been a leak or spill and to alert of potentially radioactive fluid in a spill tray of the bracket.

As best shown in FIGS. 2 and 3, the cap 200 can further include a vent channel 216 at an underside of the cap 200 (i.e., a bottom surface). The vent channel 216 can provide fluid communication from one or more vials to the external vent 210. By way of example, the vent channel 216 can be provided between one of the transfer vials 320 and the vent opening 214. However, other configurations are also possible and are contemplated herein. The vent channel 216 together with the external vent 210 can ensure that the multiple source container 100 maintains atmospheric pressure even when fluid is added or removed from the multiple source container 100.

The multiple source container 100 can be constructed from a radiation shielding material. For example, the cap 200 and/or the housing 300 can be constructed out of lead, tungsten, tin, antimony, bismuth, concrete, or other suitable materials. In further embodiments, the multiple source container 100 or component(s) thereof can be constructed from non-shielding materials such as polyetheretherketone (PEEK) plastic.

As can be appreciated, the multiple source container 100 can be used with many and multiple types of fluids. For example, if the multiple source container 100 includes eight source vials 310, the multiple source container 100 can store up to eight different types of source materials. In some embodiments, the source fluids to be placed in the source vials 310 can include radioactive materials such as molybdenum-98 or molybdenum-100.

Specific embodiments of a multiple source container according to this disclosure have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. A multiple source container comprising:
- a cap attachable to a housing; and
- the housing comprising a plurality of source vials and a plurality of transfer vials,
- wherein
- the housing defines a plurality of ports,
- each of the plurality of source vials and each of the transfer vials is in fluid communication with one of the plurality of ports, and
- the housing includes a mount for receiving one or more probes;
- wherein a hole is provided at a bottom of each of the plurality of source vials and each of the plurality of transfer vials, wherein each hole is coupled to one of the plurality of ports respectively;
- wherein the housing further comprising a base having a manifold, and wherein the plurality of ports are provided in the manifold; and
- wherein the manifold further includes the mount for receiving one or more probes.

2. The multiple source container of claim 1, wherein the cap and the housing are made from a radiation shielding material.

3. The multiple source container of claim 1, wherein the plurality of source vials and the plurality of transfer vials are adapted to store radioactive materials therein.

4. The multiple source container of claim 1, wherein the cap further comprises an external vent configured to vent from the housing to an external environment when the cap is affixed to the housing.

5. The multiple source container of claim 1, wherein the housing comprises a plurality of dividing walls, wherein each of the plurality of dividing walls separates two of the plurality of source vials from one another, two of the plurality of transfer vials from one another, or one of the plurality of source vials from one of the plurality of transfer vials.

6. The multiple source container of claim 5, wherein each of the plurality of dividing walls further comprises a balancing vent.

7. The multiple source container of claim 1, wherein the housing comprises a fluid trap.

8. The multiple source container of claim 4, wherein the cap further comprises a vent channel at a bottom surface of the cap, the vent channel is positioned to provide venting to at least one of the plurality of source vials or the plurality of transfer vials.

9. The multiple source container of claim 1, wherein each of the plurality of ports is a one-way valve or a two-way valve.

10. The multiple source container of claim 1, wherein the cap and the housing are each constructed out of a radiation shielding material.

11. The multiple source container of claim 1, wherein the plurality of source vials are each provided along a perimeter of the housing, and wherein the plurality of transfer vials are each provided proximal to a center of the housing.

12. A multiple source container comprising:

a cap attachable to a housing;

the housing comprising a plurality of source vials and a plurality of transfer vials;

a plurality of ports, wherein a hole is provided at a bottom of each of the plurality of source vials and each of the plurality of transfer vials, wherein the hole is each coupled to one of the plurality of ports respective; and the housing further comprising a base having a manifold, wherein the plurality of ports are provided in the manifold, wherein a bottom of each of the plurality of source vials and each of the plurality of transfer vials are conical in shape.

13. A method for handling multiple source materials comprising:

providing a multiple source container including a housing, and a cap attachable to the housing, the housing including a plurality of source vials and a plurality of transfer vials, a plurality of ports, each of the plurality of source vials and each of the transfer vials being in fluid communication with one of the plurality of ports, and a mount for receiving one or more probes; and providing a first fluid in a first source vial that is one of the plurality of source vials; and transferring the fluid from the first source vial to one of a plurality of transfer vials; and transferring the fluid from the one of the plurality of transfer vials back to the first source vial.

14. The method of claim 13 further comprising:

providing a second fluid in a second source vial that is another one of the plurality of source vials, wherein the first fluid is different from the second fluid.

15. The method of claim 13, wherein the fluid is a radioactive material.

* * * * *